US010002553B2

(12) United States Patent
Birch et al.

(10) Patent No.: US 10,002,553 B2
(45) Date of Patent: Jun. 19, 2018

(54) METHOD, SYSTEM, AND DEVICE FOR DETERMINING A LOCATION OF MICRO DIGITAL SIGNAGE DEVICES

(71) Applicant: Intel Corporation, Santa Clara, CA (US)

(72) Inventors: Thomas A. Birch, Portland, OR (US); Michael J. Kasper, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 403 days.

(21) Appl. No.: 14/612,762

(22) Filed: Feb. 3, 2015

(65) Prior Publication Data

US 2015/0170556 A1 Jun. 18, 2015

Related U.S. Application Data

(62) Division of application No. 13/631,484, filed on Sep. 28, 2012, now Pat. No. 8,947,321.

(51) Int. Cl.
*G06Q 10/00* (2012.01)
*G06Q 30/00* (2012.01)
*G09F 19/00* (2006.01)

(52) U.S. Cl.
CPC ............. *G09F 19/00* (2013.01); *G06Q 10/00* (2013.01); *G09G 2380/04* (2013.01); *G09G 2380/06* (2013.01)

(58) Field of Classification Search
None
See application file for complete search history.

(56) References Cited

U.S. PATENT DOCUMENTS

| 2007/0055389 | A1 | 3/2007 | Harwood |
| 2007/0252891 | A1 | 11/2007 | Gurley |
| 2009/0106082 | A1 | 4/2009 | Senti et al. |
| 2009/0199108 | A1 | 8/2009 | Bannister et al. |
| 2012/0066035 | A1 | 3/2012 | Stanger et al. |
| 2012/0159536 | A1 | 6/2012 | Treacy et al. |
| 2012/0284132 | A1* | 11/2012 | Kim ..................... G07G 1/0081 705/20 |

(Continued)

OTHER PUBLICATIONS

Intel Corp., "Micro Digital Signage Hardware Integration," International Patent Application No. PCT/US2011/064928, filed Dec. 14, 2011, 28 pages.

(Continued)

*Primary Examiner* — Ariel J Yu
(74) *Attorney, Agent, or Firm* — Barnes & Thornburg LLP

(57) ABSTRACT

A device, system, and method for determining a location of micro digital signage devices includes generating and transmitting a unique identifier corresponding to each micro digital signage device. Each micro digital signage device is to display its corresponding unique identifier and capture an image of other micro digital signage devices located on an opposite side of an aisle. The captured images are to be stitched together to generate a composite image. The unique identifiers of the micro digital signage devices are to be identified and the location of each micro digital signage device is to be determined using a known location of one of the micro digital signage devices as a reference. Each micro digital signage device identified from the composite image is to clear its corresponding unique identifier from display.

16 Claims, 9 Drawing Sheets

(56) References Cited

U.S. PATENT DOCUMENTS

| | | |
|---|---|---|
| 2012/0296777 A1* | 11/2012 | Fugman ............. G06Q 30/0281 |
| | | 705/27.1 |
| 2012/0310744 A1 | 12/2012 | Kim et al. |
| 2013/0006790 A1* | 1/2013 | Raskin ................. G06Q 10/063 |
| | | 705/26.1 |
| 2013/0182904 A1 | 7/2013 | Zhang et al. |
| 2013/0229490 A1* | 9/2013 | Lee .................... G06Q 30/0261 |
| | | 348/46 |
| 2014/0032327 A1 | 1/2014 | Prakash et al. |
| 2014/0222578 A1 | 8/2014 | Poornachandran et al. |

OTHER PUBLICATIONS

Intel Corp., "Method and Apparatus for Managing Product Placement on Store Shelf," International Patent Application No. PCT/US2012/032420, filed Apr. 5, 2012, 25 pages.

Intel Corp., "Presnetataion-structure-aware Display of Planograms," International Patent Application No. PCT/US2012/031652, filed Mar. 30, 2012, 32 pages.

\* cited by examiner

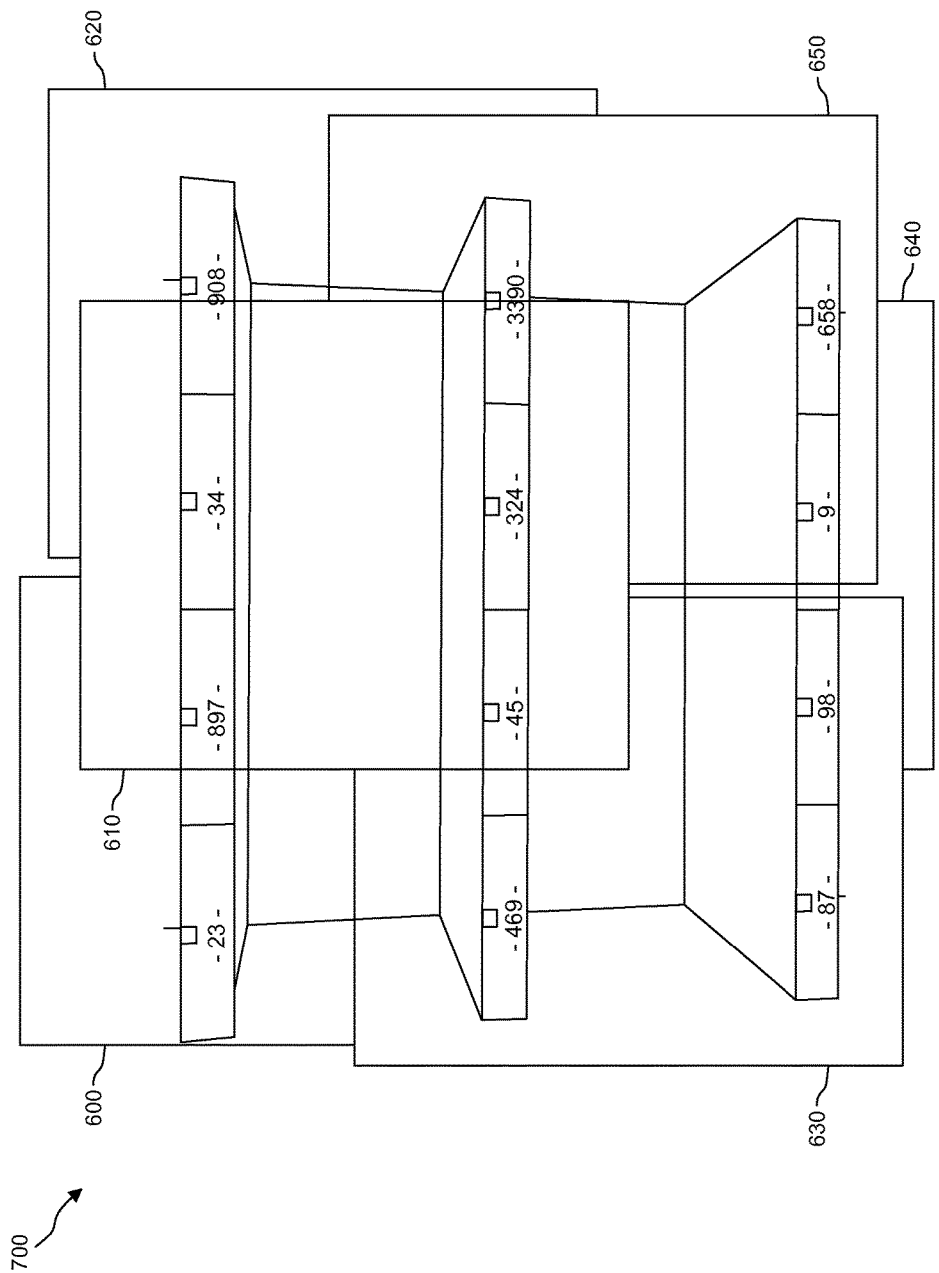

METHOD, SYSTEM, AND DEVICE FOR DETERMINING A LOCATION OF MICRO DIGITAL SIGNAGE DEVICES

CROSS-REFERENCE TO RELATED APPLICATION

This application is a divisional application of U.S. application Ser. No. 13/631,484, entitled "Method, System, and Device for Determining a Location of Micro Digital Signage Devices," which was filed on Sep. 28, 2012.

BACKGROUND

Labels and tags are used by retail stores to display price and product information to nearby consumers. For each product being sold, a separate label or tag is typically affixed to the front edge of the shelf upon which the product is located. The information (e.g., price, description, barcode, stock-keeping unit number, etc.) displayed on a shelf label or tag is static and typically embodied as physical print on a substrate medium such as a paper, plastic, or canvas. Manually managing that information for each of the products is time consuming and prone to errors.

Micro digital signage devices are also used to display price and product information to nearby consumers. Unlike shelf labels and tags embodied as physical print on a substrate medium, micro digital signage devices may be configured to display digital content received from a server. As a result, the information (e.g., a product price) displayed by a micro digital signage device may be dynamically changed. Micro digital signage devices may also be configured to gather data about consumers, which may be analyzed by the server to detect different consumer patterns. To do so, the server must be able determine the micro digital signage device and the location from which the data was gathered. However, in environments wherein a larger number of micro digital signage devices are deployed, manually configuring location information for each micro digital signage device may be time consuming and prone to errors. In addition, because of the close proximity of micro digital signage devices to one another, detecting location information for each of the micro digital signage devices using radio frequency triangulation, global positioning coordinates, or other location determination mechanisms is also difficult.

BRIEF DESCRIPTION

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 7 is a simplified block diagram of at least one embodiment of an image of one side of the aisle of FIG. 4 stitched together using the images of FIGS. 6A-6F captured by micro digital signage devices located on the other side of the aisle;

DETAILED DESCRIPTION

Figure 1:
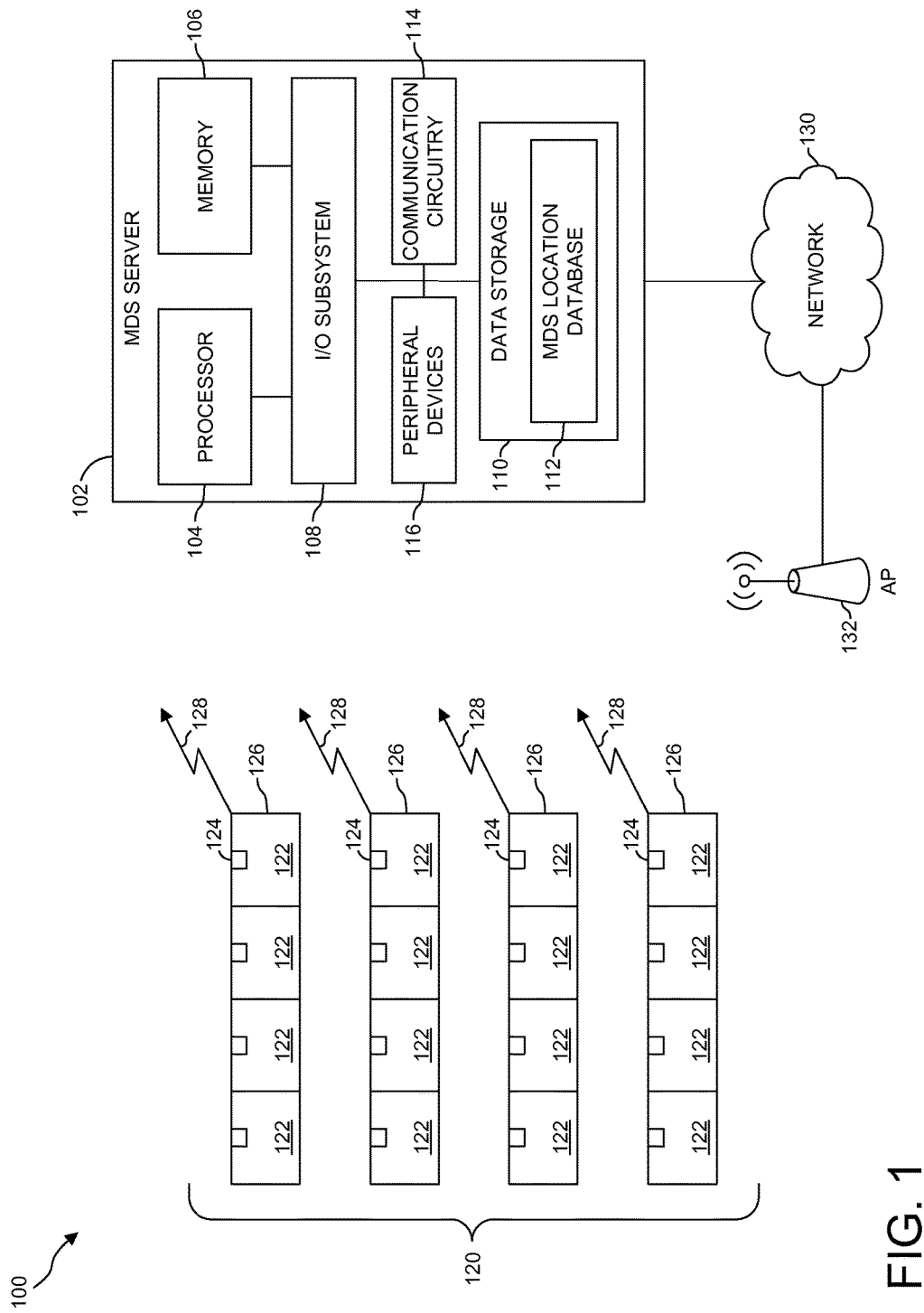
FIG. 1 is a simplified block diagram of at least one embodiment of a system for determining a location of micro digital signage devices and managing micro digital signage devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for determining a location of and managing a micro digital signage ("MDS") device 122 includes one or more MDS devices 120, an MDS server 102, and a network 130. A plurality of the MDS devices 120 may be linearly interconnected and attached to or otherwise coupled to a row of shelves in a retail store. In some embodiments, each row of shelves in a shelving unit may include a different plurality of the MDS devices 120. The one or more MDS devices 120 may be configured to display product information (e.g., product price, product reviews, discount information, recipes, nutrition information, promotions, etc.) corresponding to one or more products associated therewith. Such product information may be transmitted over the network 130 by the MDS server 102 and received by one or more of the MDS devices 120. Additionally, the MDS server 102 may transmit other types of data (e.g., commands, firmware updates, software updates, images, etc.) to one or more of the MDS devices 120 in some embodiments.

The one or more MDS devices 120 may also be configured to gather data about one or more products in a retail store (e.g., a position of a product relative to a MDS device 122 or a shelf, a quantity of a product remaining, etc.) or data about actual consumers (e.g., consumer proximity to a MDS device 122, consumer motion relative to a MDS device 122, etc.). In some embodiments, the MDS server 102 may be configured to perform consumer traffic pattern analysis or any other type of analysis using the data gathered from the one or more MDS devices 120. To do so, the MDS server 102 must be able to determine the MDS device 122 and the location from which the data was gathered. In environments wherein a large number of MDS devices 120 are deployed in close proximity to each other, determining the location of each of the MDS devices 120 using conventional mechanisms of location determination (e.g., radio frequency triangulation, global positioning coordinates, etc.) is difficult. Additionally, manually configuring location information for each MDS device 122 may be time consuming and prone to errors.

To facilitate determining the location of each of the MDS devices 120, the MDS server 102 may, in some embodiments, transmit a message or otherwise instruct each of the MDS devices 120 to display a different unique identifier (e.g., a unique number, string, barcode, image, etc.). Thereafter, each of the MDS devices 120 on one side of an aisle may be configured to capture an image of one or more other MDS devices 120 located on an opposite side of the aisle using an associated camera. The captured images may be transmitted over the network 130 to the MDS server 102.

Upon to receiving the captured images, the MDS server 102 may stitch together the received images to generate a composite image of the one or more MDS devices 120 located on the opposite side of the aisle. To do so, the MDS server 102 may perform edge detection and/or pattern recognition on each of the received images. In such embodiments, the resulting composite image may be a digital representation of the one or more MDS devices 120 located on the opposite side of the aisle.

After stitching together the received images into a composite image, the MDS server 102 may be configured to identify the unique identifiers of the MDS devices 120 from the composite image. In some embodiments, the location of one of the MDS devices 122 may already be known (e.g., a manually configured location, etc.). In such embodiments, the MDS server 102 may first identify the unique identifier that corresponds to the MDS device 122 for which the location is already known. The MDS server 102 may then identify the unique identifiers of the MDS devices 120 located in proximity (e.g., directly above, directly to the left, directly to the right, directly below, two above, two below, etc.) of the MDS device 122 for which the location is already known. The MDS server 102 may perform a similar identification operations for each MDS device 122 identified in the composite image. That is, for each MDS device 122 identified, the MDS server 102 may identify one or more other "neighbor" MDS devices 120. In that way, the MDS server 102 may determine the location of each of the MDS devices 120 located on the opposite side of the aisle.

In response to identifying the location of a MDS device 122 from the composite image, the MDS server 102 may transmit a message or otherwise instruct the identified MDS device 122 to stop displaying its unique identifier. For example, the MDS server 102 may, in some embodiments, instruct the identified MDS device 122 to gray out (e.g., dim, shade, clear, etc.) display its unique identifier. In some embodiments, the unique identifiers corresponding to the MDS devices 120 not able to be identified by the MDS server 102 may remain displayed. Thereafter, a user or administrator of the system 100 may only be required to enter the locations of those devices manually.

The MDS server 102 may be embodied as any type of server or computing device capable of processing, communicating, storing, maintaining, and transferring data. In the illustrative embodiment of FIG. 1, the MDS server 102 includes a processor 104, a memory 106, an I/O subsystem 108, a data storage 110, communication circuitry 114, and one or more peripheral devices 116. Of course, the MDS server 102 may include other or additional components, such as those commonly found in a server and/or computer (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 104 in some embodiments.

The processor 104 may be embodied as any type of processor capable of performing the functions described herein. For example, the processor may be embodied as a single or multi-core processor(s), digital signal processor, microcontroller, or other processor or processing/controlling circuit. Similarly, the memory 106 may be embodied as any type of volatile or non-volatile memory or data storage capable of performing the functions described herein. In operation, the memory 106 may store various data and software used during operation of the MDS server 102 such as operating systems, applications, programs, libraries, and drivers. The memory 106 is communicatively coupled to the processor 104 via the I/O subsystem 108, which may be embodied as circuitry and/or components to facilitate input/output operations with the processor 104, the memory 106, and other components of the MDS server 102. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 104, the memory 106, and other components of the MDS server 102, on a single integrated circuit chip.

The data storage 110 may be embodied as any type of device or devices configured for the short-term or long-term storage of data such as, for example, memory devices and circuits, memory cards, hard disk drives, solid-state drives, or other data storage devices. In some embodiments, the data storage 110 may be used to store data associated one or more of the MDS devices 120. For example, the data storage 110 may include a MDS location database 112. The MDS location database 112 may store location data corresponding to one or more of the MDS devices 120. The MDS location database 112 may also store any other type of data associated with the one or more MDS devices 120. For example, in some embodiments, the MDS location database 112 may also store an Internet Protocol ("IP") address and a unique identifier for each MDS device 122.

The communication circuitry 114 of the MDS server 102 may be embodied as any number of devices and circuitry for enabling communications between the MDS server 102 and one or more remote computing devices over a network 130. For example, the communication circuitry 114 may enable communications between the MDS server 102 and one or more of the MDS devices 120 over the network 130. The communication circuitry 114 may be embodied as a network interface controller (NIC) in some embodiments. The communication circuitry 114 may be further configured to use any one or more, or combination thereof, communication protocols to communicate with the network 130 such as, for example, a cellular communication protocol (e.g., Wideband Code Division Multiple Access (W-CDMA)), a wireless network communication protocol (e.g., Wi-Fi®, WiMAX), a wired network communication protocol (e.g., Ethernet), and/or other communication protocols.

The network 130 may be embodied as any number of various wired and/or wireless communication networks. For example, the network 130 may be embodied as or otherwise include a local area network (LAN), a wide area network (WAN), a mobile network, or a publicly-accessible, global network such as the Internet. Additionally, the network 130 may include any number of additional devices to facilitate communication between the MDS server 102 and one or more of the MDS devices 120. For example, in some embodiments, one or more of the MDS devices 120 may communicate with the MDS server 102 over the network 130 using a wireless access point 132 as a proxy.

The peripheral devices 116 of the MDS server 102 may include any number of additional input/output devices, interface devices, and/or other peripheral devices. For example, the peripheral devices 116 may include a display for displaying content to a user, a keyboard, mouse, or other input/output peripheral devices.

Each MDS device 122 of the MDS devices 120 may be embodied as any type of computing device capable of performing the functions described herein. As described in more detail below with reference to FIG. 2, each of the MDS devices 120 may include various hardware and software components (e.g., a processor, memory, and communication circuitry) typically found in a computing device for processing, receiving, storing, and communicating, data over the network 130. Additionally, each MDS device 122 may include a camera 124 to capture images of one or more other MDS devices 120. In embodiments wherein the system 100 includes rows of linearly interconnected MDS devices 120, each row of MDS devices 120 may include an end MDS device 126 configured as a proxy communication device.

Figure 2:
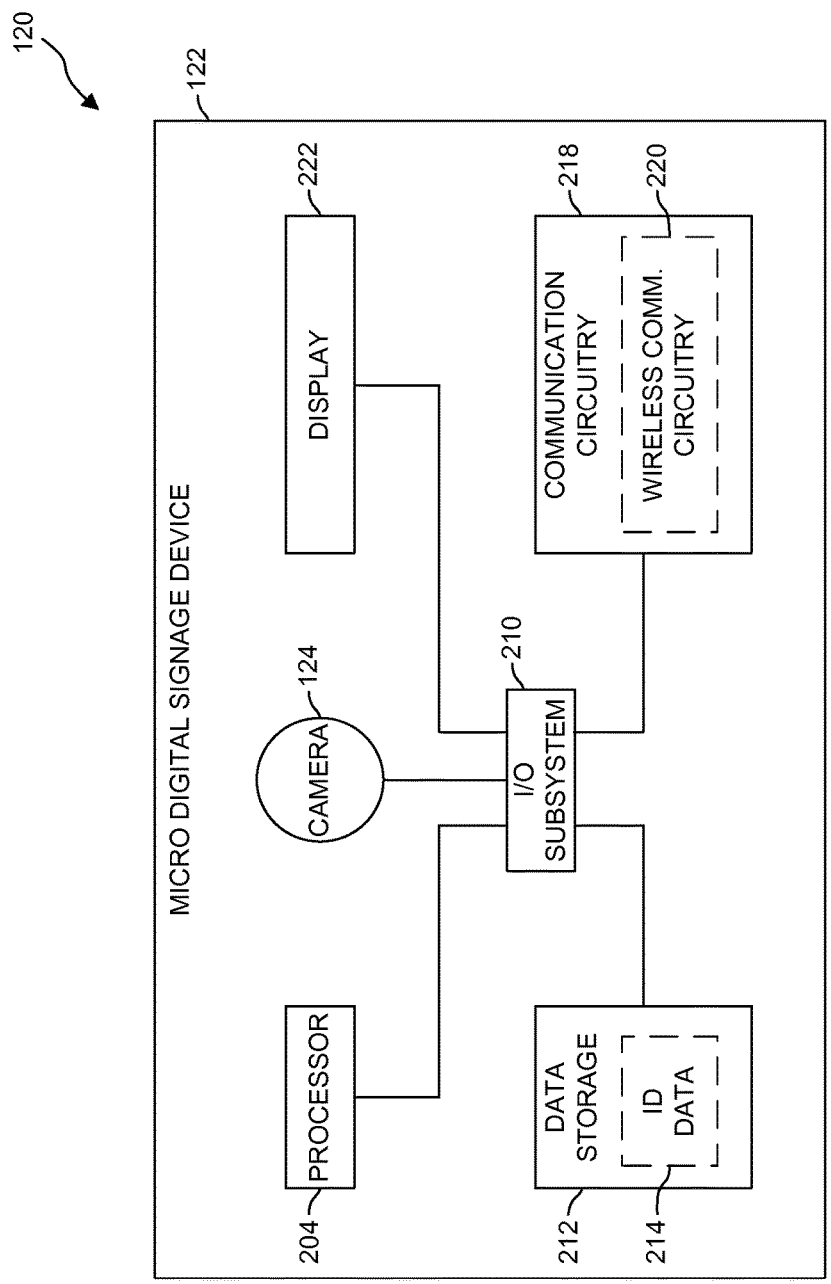
FIG. 2 is a simplified block diagram of at least one embodiment of a micro digital signage device of FIG. 1.

Referring now to FIG. 2, in one embodiment, each MDS device 122 of the MDS devices 120 includes a processor 204, an I/O subsystem 210, a data storage 212, communication circuitry 218, the camera 124, and a display 222. In some embodiments, the processor 204, I/O subsystem 210, communication circuitry 218, and data storage 212 may include a similar structure and have similar functionality to the processor 104, I/O subsystem 108, communication circuitry 114, and data storage 110 of the MDS server 102 and, as such, the description of those components is equally applicable to the corresponding components of the MDS device 122. In the illustrative embodiment, the communication circuitry 218 may additionally include wireless communication circuitry 220 to facilitate wireless communications 128 between the MDS device 122 and the MDS server 102. In some embodiments, the communication circuitry 218 of the MDS device 122 may communicate directly with the MDS server 102 via the wireless access point 132 and the network 130. Additionally or alternatively, the communication circuitry 218 of the MDS device 122 may communicate with the MDS server 102 through another MDS device 122. For example, as discussed above, the MDS device 122 may communicate with the MDS server 102 through an end MDS device 126, which is configured to act as a communication proxy for a plurality of MDS devices 120 linearly interconnected in a row.

In various embodiments, the data storage 212 may include unique identifier data 214. As described in more detail below, the unique identifier data 214 may be embodied as, or otherwise include, a unique number sent over the network 130 by the MDS server 102. It should be understood that although the unique identifier data 214 is described as being embodied as a unique number in the illustrative embodiment, the unique identifier data 214 may be embodied as any type of data suitable for uniquely identifying the MDS device 122 in other embodiments. For example, the unique identifier data 214 of some embodiments may be embodied as, or otherwise include, a unique character string, a unique image, a unique barcode, or any other form of data that uniquely identifies the MDS device 122.

As discussed above, the camera 124 of the MDS device 122 may be configured to capture images of one or more other MDS devices 120. In the illustrative embodiment shown, the camera 124 of the MDS device 122 is embodied as an integrated camera. However, although the camera 124 of the MDS device 122 of the illustrative embodiment is described as embodying an integrated camera, the camera 124 of other embodiments may include any other type of image capture devices. For example, in some embodiments, the camera 124 may be embodied as a digital point-and-shoot camera, a digital single-lens reflex (DSLR) camera, a smart phone camera, a tablet camera, or any other type of imaging device suitable for capturing images of one or more other MDS devices 120.

The display 222 of each MDS device 122 may be embodied as any type of display device for displaying information to a consumer. For example, the display 222 may be configured to display product information (e.g., product price, product reviews, discount information, recipes, nutrition information, promotions, etc.) received from the MDS server 102. As described in more detail below, the display 222 may also be configured to display a unique identifier provided by the MDS server 102. In some embodiments, the display 222 of the MDS device 122 may be a color display. The display 222 of the MDS device 122 may be configured to display information independently or in cooperation with one or more neighboring (e.g., interconnected) MDS devices 120. The display 222 may also be embodied as a touch-sensitive display for enabling a consumer to interact with the MDS device 122. For example, the display 222 may be configured to enable a consumer to manipulate the product information being displayed or provide feedback regarding one or more products associated the MDS device 122.

In some embodiments, several of the foregoing components may be incorporated on a motherboard of the MDS device 122, while other components may be communicatively coupled to the motherboard via, for example, a peripheral port. Furthermore, it should be appreciated that the MDS device 122 may provide other functionality and/or include other components, sub-components, and devices commonly found in a MDS device, which are not illustrated in FIG. 2 for clarity of the description. For example, in some embodiments, the MDS device 122 may include one or more components and/or functionality similar the ones described in International Patent Application No. PCT/US2011/064928.

Figure 3:
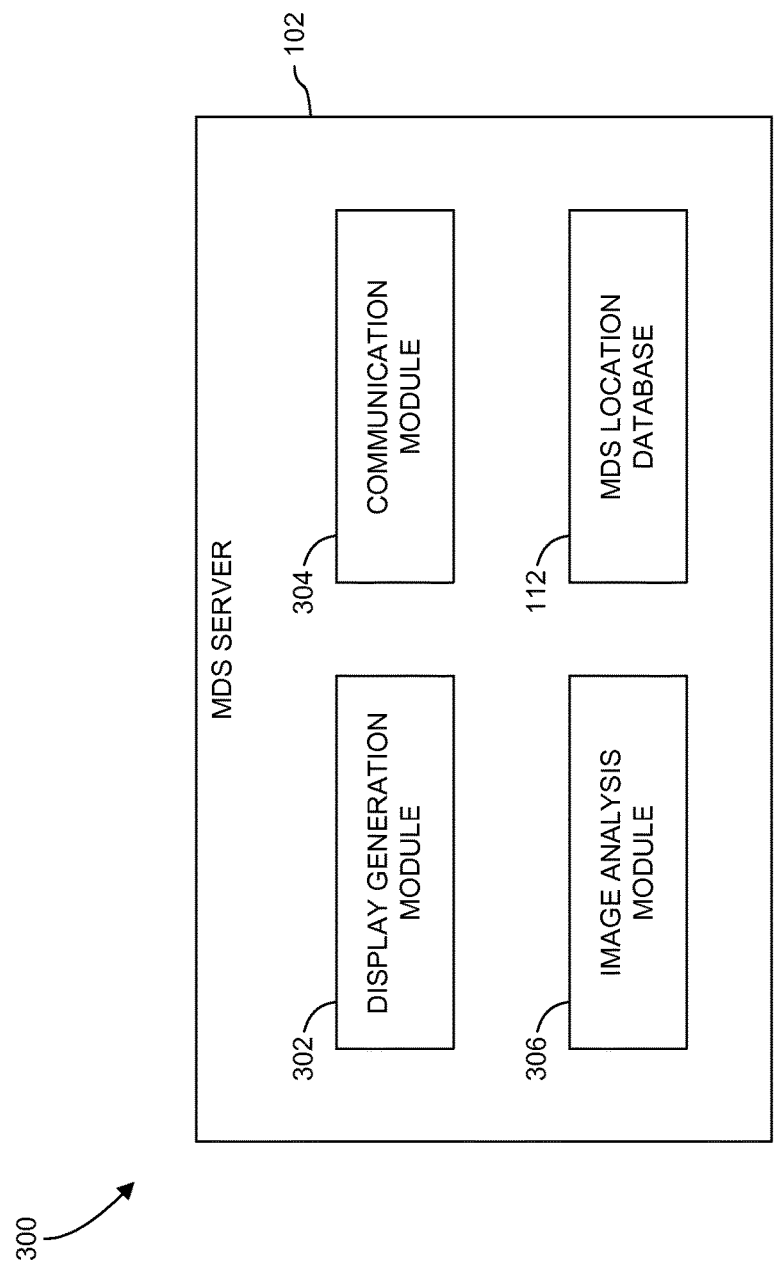
FIG. 3 is a simplified block diagram of at least one embodiment of an environment of the micro digital signage server of FIG. 1.

Referring now to FIG. 3, one embodiment of an environment 300 of the MDS server 102 includes a display generation module 302, a communication module 304, an image analysis module 306, and the MDS location database 112. It should be understood that the environment 300 and/or any of the modules included therein may be implemented in hardware, firmware, software, or any combination thereof. Additionally, it should be appreciated that the MDS server 102 may include other components, sub-components, modules, and devices commonly found in a computing server device, which are not illustrated in FIG. 3 for clarity of the description.

The MDS server 102 may transmit product information (e.g., product price, product reviews, discount information, recipes, nutrition information, promotions, etc.) and other types of data (e.g., unique identifiers, commands, firmware updates, software updates, images, etc.) over the network 130 to one or more of the MDS devices 120. Additionally, the MDS server 102 may be further configured to perform consumer traffic pattern analysis or any other type of analysis using data gathered from the one or more MDS devices 120. To do so, the MDS server 102 determines the MDS device 122 and the location from which the data was gathered. As discussed, determining the location of each of the MDS devices 120 using conventional mechanisms of location determination (e.g., radio frequency triangulation, global positioning coordinates, etc.) is difficult in environments wherein a large number of MDS devices 120 are deployed in close proximity to each other. Further, manually configuring location information for each MDS device 122 is time consuming and may be prone to errors.

The display generation module 302 may generate the product information and other types of data to be displayed by one or more of the MDS devices 120. To facilitate determining the location of one or more of the MDS devices 120, the display generation module 302 generates a unique identifier for each MDS device 122 in some embodiments. The unique identifier generated by the display generation module 302 may be embodied as a unique number surrounded on either side by a "dash mark" (e.g., "-23-", "-897-", "-34-", etc.). Additionally or alternatively, the unique identifier may be embodied as a unique character string, an image, a barcode, or any other suitable type of displayable mark or notation for uniquely identifying each of the MDS devices 120.

The display generation module 302 may also instruct each of the MDS devices 120 to display content or perform other operations. For example, the display generation module 302 may be configured to generate one or more messages and/or commands that cause one or more of the MDS devices 120 to display its corresponding unique identifier. Similarly, the display generation module 302 may also be configured to cause one or more of the MDS devices 120 to stop displaying its corresponding unique identifier. For example, in some embodiments, the display generation module 302 may instruct one or more of the MDS devices 120 to gray out (e.g., dim, shade, clear, etc.) display of its corresponding unique identifier. Additionally or alternatively, the display generation module 302 may be further configured to instruct one or more of the MDS devices 120 to capture an image (e.g., via a corresponding camera 124) of one or more other MDS devices 120.

The communication module 304 facilitates communications with the one or more MDS devices 120. In operation, the communication module 304 may transmit the product information and other types of data (e.g., the unique identifier, commands, messages, etc.) generated by the display generation module 302 to one or more of the MDS devices 120. To do so, the communication module 304 may send communications to one or more of the MDS devices 120 over the network 130 using the IP address assigned to each MDS device 122. Of course, it should be understood that in some embodiments, the communication module 304 may send the same communication to a plurality of the MDS devices 120 using a suitable broadcast address.

The image analysis module 306 may receive images captured by one or more of the MDS devices 120. In operation, the communication module 304 may receive the captured images from the MDS devices 120 and thereafter send the images to the image analysis module 306 for processing. As discussed above, in some embodiments, one or more MDS devices 120 located on one side of an aisle may capture images (illustratively shown in FIGS. 6A-6F) of one or more MDS devices 120 located on the other side of the aisle (illustratively shown in FIG. 5). In such embodiments, each of the MDS devices 120 located on the other side of the aisle may display their unique identifiers prior to image capture as instructed by the display generation module 302 (illustratively shown in FIG. 4). In that way, each of the captured images received by the image analysis module 306 may be embodied as a digital image representing one or more MDS devices 120 and its corresponding unique identifier.

Upon receiving the captured images, the image analysis module 306 may stitch together the received images to generate a composite image of the one or more MDS devices 120 located on the opposite side of the aisle (illustratively shown in FIG. 7). To do so, the image analysis module 306 may perform edge detection and/or pattern recognition on each of the received images. In such embodiments, the resulting composite image may be a digital representation of the one or more MDS devices 120 located on the opposite side of the aisle.

The image analysis module 306 may also facilitate determining the location of each of the one or more MDS devices 120 located on the opposite side of the aisle. To do so, the image analysis module 306 may also identify one or more of the unique numbers corresponding to the one or more MDS devices 120 represented in the composite image. In some embodiments, the location of at least one MDS device 122 located on the opposite side of the aisle may be known (e.g., manually configured by a user or administrator of the MDS server 102). As such, image analysis module 306 may first identify, from within the composite image, the unique identifier corresponding to the MDS device 122 for which the location is previously known. Thereafter, the image analysis module 306 may identify one or more unique identifiers corresponding to one or more MDS devices 120 located in proximity of the MDS device 122 for which the location is previously known. Using the location of the MDS device 122 for which the location is already known as a reference point, the image analysis module 306 may then determine a location for each of the one or more MDS devices 120 identified as being in proximity. The image analysis module 306 may perform similar identification operations until all of the unique identifiers corresponding to the MDS devices 120 in the composite image are identified. That is, for each MDS device 122 identified within the composite image, the image analysis module 306 may identify one or more other or "neighbor" MDS devices 120. For each new "neighbor" MDS device 122 identified within the composite image, the image analysis module 306 may determine a corresponding location as a function of a previously identified location for another "neighbor" MDS device 122. In that way, the MDS server 102 may determine the location of each of the MDS devices 120 located on the located on the opposite side of the aisle.

The MDS location database 112 may store location data corresponding to one or more of the MDS devices 120. Additionally, the MDS location database 112 may also store any other type of data associated with the one or more MDS devices 120. For example, in some embodiments, the MDS location database 112 may store the IP address and unique identifier corresponding to each MDS device 122. In some embodiments, the MDS location database 112 may cooperate with the image analysis module 306 to facilitate determining the location of one or more of the MDS devices 120. For example, the MDS location database 112 may correlate the unique identifiers identified from within a composite image with corresponding location information determined by the image analysis module 306. In some embodiments, the image analysis module 306 may be configured to obtain the unique identifier and corresponding location (e.g., a previously known location or a determined location) of one or more of the MDS devices 120 from the MDS location database 112.

Figure 4:
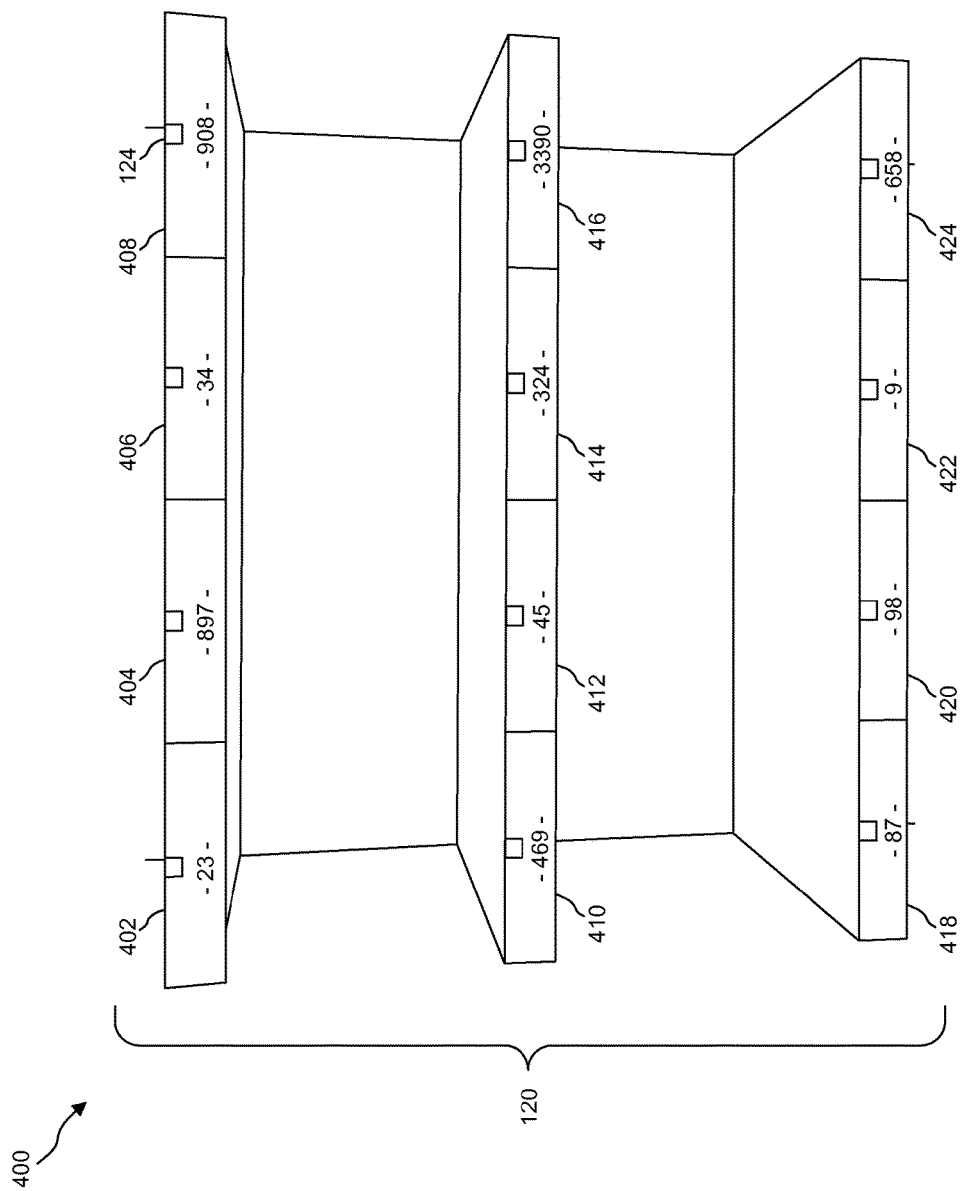
FIG. 4 is a simplified block diagram of at least one embodiment of the micro digital signage devices of FIG. 1 attached to a shelving unit located on one side of an aisle.

Referring now to FIG. 4, in an embodiment, a plurality of MDS devices 120 (referenced as MDS devices 402-424 in FIG. 4) may be incorporated in, or otherwise secured to, a shelving unit 400 located on one side of a shopping aisle. As discussed above, each of the plurality of MDS devices 120 includes a camera 124 or other suitable image capture device for capturing an image of one or more other MDS devices 120 located on another shelving unit located on the opposite of the aisle. Additionally, as discussed above, the MDS server 102 generates a unique identifier for each of the plurality of MDS devices 120. In some embodiments, each of the MDS devices 120 may display its corresponding unique identifier in response to receiving a command or a message from the MDS server 102. For example, the MDS server 102 may instruct MDS device 402 to display the unique identifier "-23-", MDS device 404 to display the unique identifier "-897-", MDS device 406 to display the unique identifier "-34-", MDS device 408 to display the unique identifier "-408-", MDS device 410 to display the unique identifier "-469-", MDS device 412 to display the unique identifier "-45-", MDS device 414 display the unique identifier "-324-", MDS device 416 to display the unique identifier "-3390-", MDS device 418 to display the unique identifier "-87-", MDS device 420 to display the unique identifier "-98-", MDS device 422 to display the unique identifier "-9-", and MDS device 424 to display the unique identifier "-658-". It should be understood that the unique identifier may not always be embodied as a unique number surrounded on either side by a "dash mark." For example, the unique identifier may be embodied additionally or alternatively as a unique character string, an image, a barcode, or any other suitable type of displayable mark or notation for uniquely identifying each of the MDS devices 120.

Figure 5:
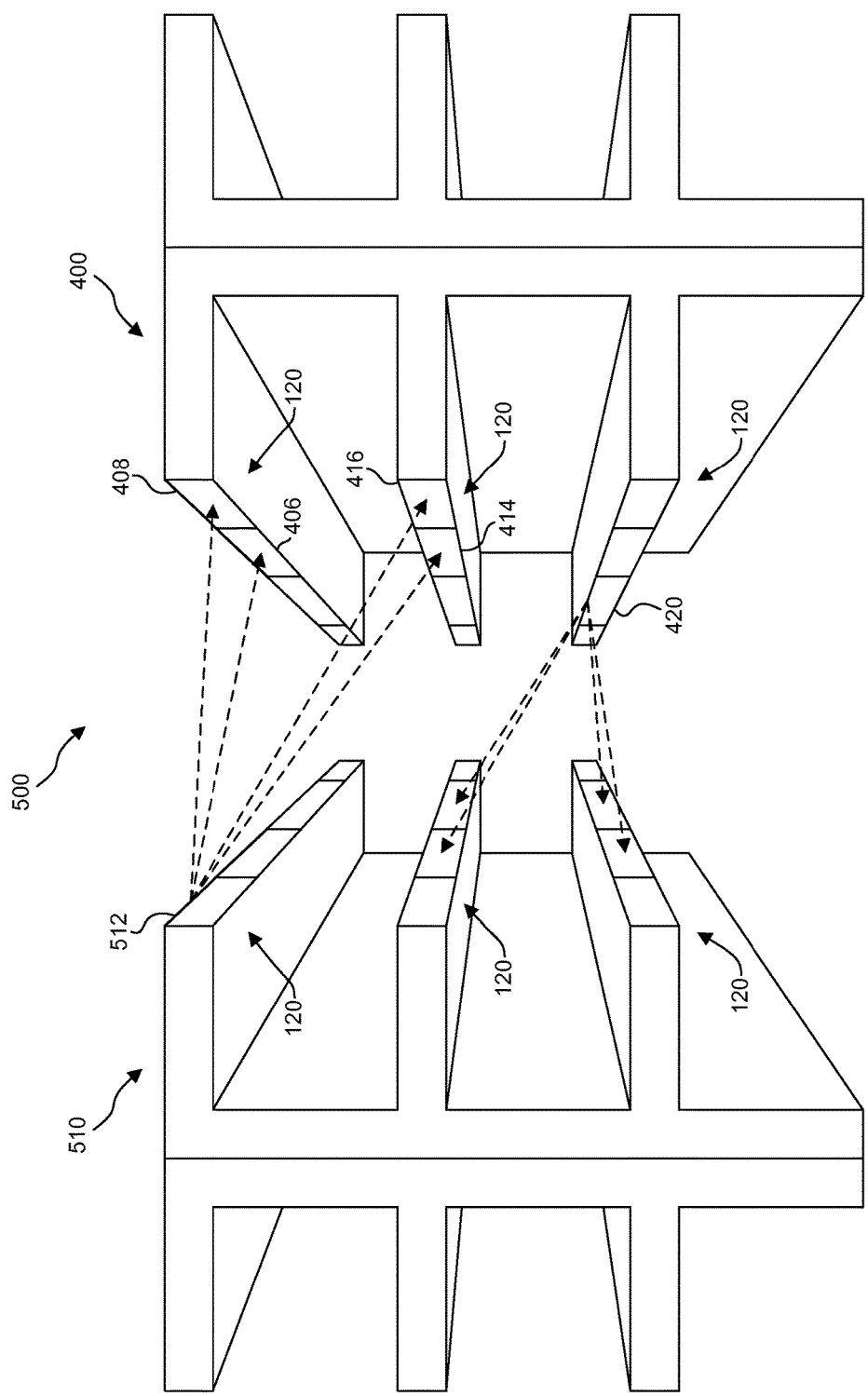
FIG. 5 is a simplified block diagram of at least one embodiment of a shopping aisle including the micro digital signage devices of FIGS. 1 and 2 on both sides.
Figure 6A:
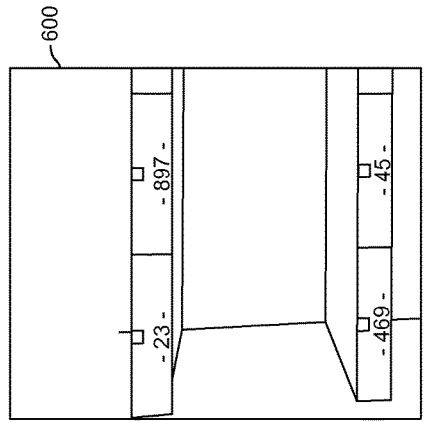
FIGS. 6A-6F are simplified block diagrams of at least one embodiment of images of the micro digital signage devices of FIG. 4 located on one side of an aisle captured by micro digital signage devices located on the other side of the aisle.
Figure 6B:
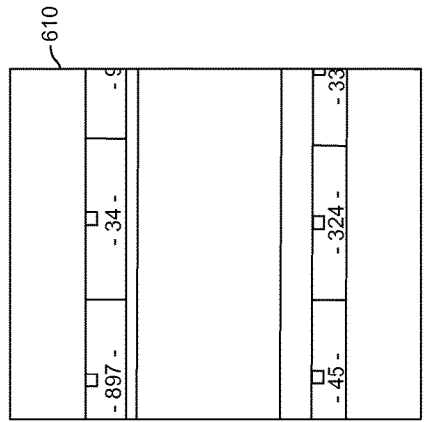
Figure 6C:
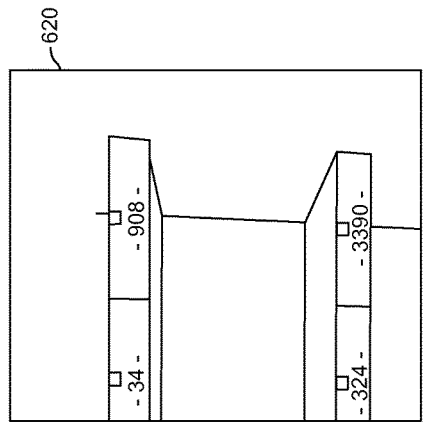
Figure 6D:
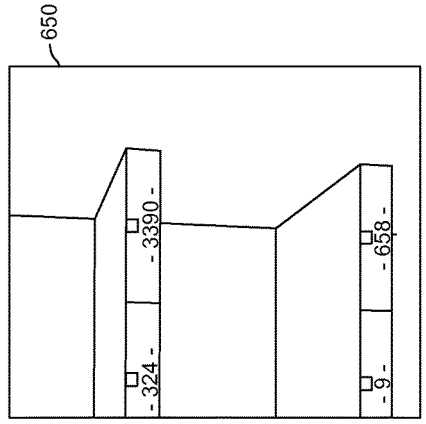
Figure 6E:
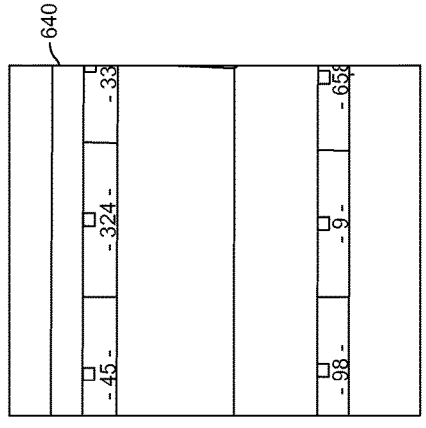
Figure 6F:
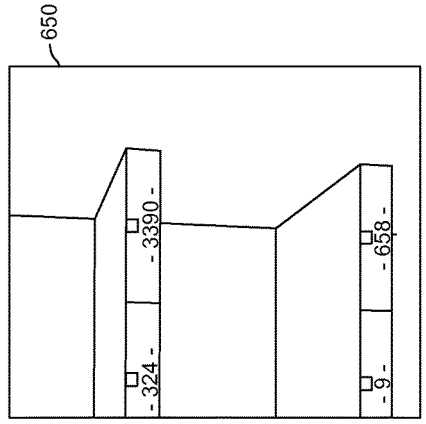

Referring now to FIG. 5, in some embodiments, a shopping aisle 500 includes a shelving unit 510 located on one side of the aisle 500 and another shelving unit (e.g., the shelving unit 400) located on the opposite side of the aisle 500. Each of the shelving units 510, 400 on either side of the aisle 500 includes a plurality of MDS devices 120. One or more MDS devices 120 located on one side of the aisle 500 may capture an image of one or more other MDS devices 120 located on the other side of the aisle 500. For example, as shown in the illustrative embodiment, the shelving unit 510 may include an MDS device 512. The MDS device 512 may capture an image of one or more MDS devices 120 (e.g., MDS device 406, MDS device 408, MDS device 414, and MDS device 416) attached to rows of the shelving unit 400 located on the other side of the aisle 500. Similarly, the shelving unit 400 may include the MDS device 420, which may capture an image of one or more MDS devices 120 attached to rows of the shelving unit 510 located on the side of the aisle 500 opposite to the shelving unit 400. It should be understood that although only one MDS device 420, 512 per shelving unit is shown as capturing images of MDS devices 120 located on an opposite shelving unit, any number of MDS devices 120 on either shelving unit 400, 510 may capture images of one or more other MDS devices 120.

Referring now to FIGS. 6A-6F, an embodiment of various images 600-650 captured by the cameras 124 of the one or more MDS devices 120 is shown. As discussed, one or more MDS devices 120 attached to one shelving unit may capture an image of one or more other MDS devices 120 attached to an opposite shelving unit (e.g., a shelving unit located across the aisle). For example, as shown in the illustrative embodiment, MDS devices 120 (e.g., MDS device 512, etc.) attached to the shelving unit 510 may capture various images 600-650 of one or more other MDS devices 120 attached to another shelving unit (e.g., the shelving unit 400) located across the aisle. As discussed, the captured images may include the one or more other MDS devices 120 and the corresponding unique identifier being displayed by each.

Referring now to FIG. 7, a composite image 700 formed by "stitching" together the various images captured by the MDS devices 120 is shown. As discussed above, the MDS server 102 in some embodiments may stitch together images of MDS devices 120 on one side of an aisle captured by MDS devices 120 located on the opposite side of the aisle. For example, the MDS server 102 may stitch together the various captured images 600-650 of the MDS devices 120 attached to the shelving unit 400 that were captured by the other MDS devices 120 attached to the shelving unit 510. To do so, the MDS server 102 may utilize any suitable image modification methodology or technology to generate the composite image 700 such as, for example, edge detection and/or pattern recognition technology.

Figure 8:
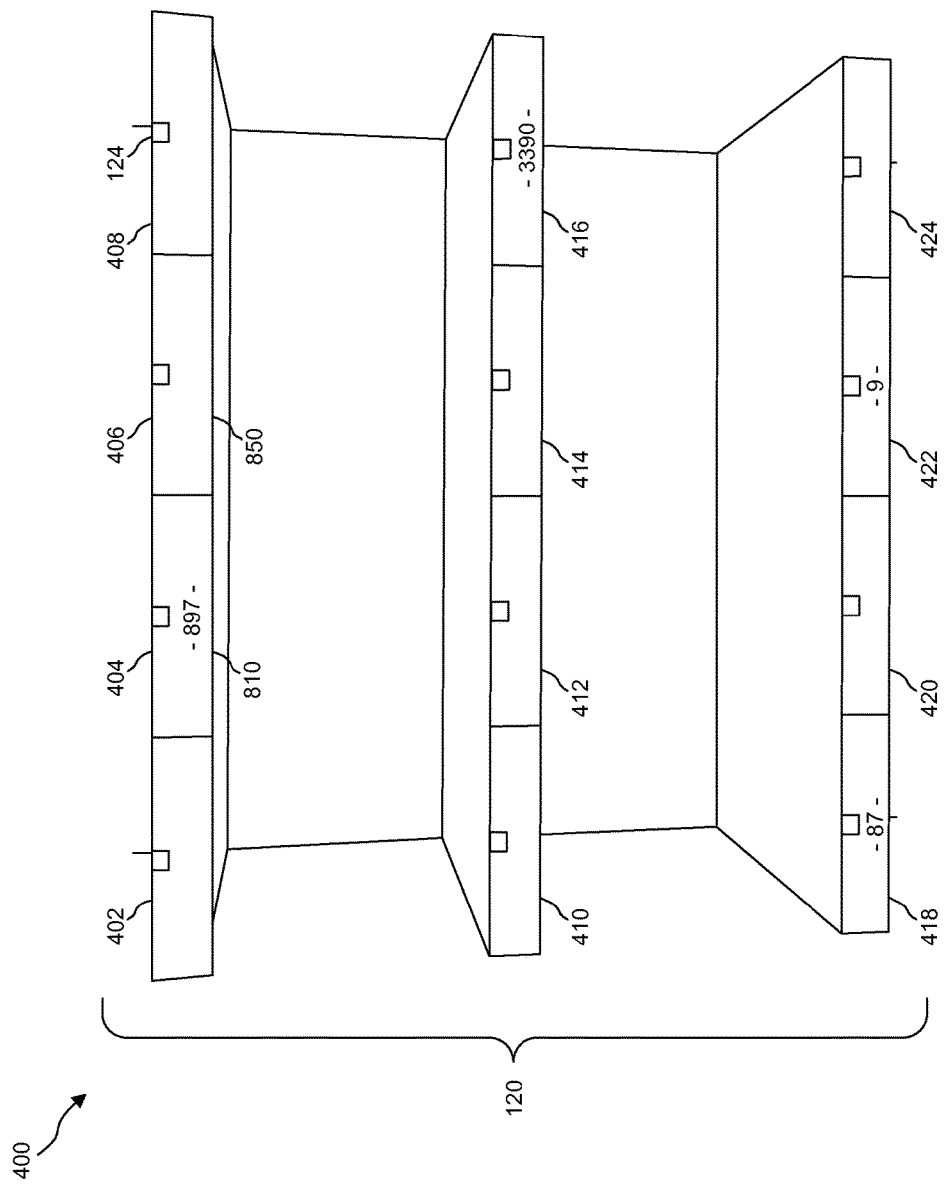
FIG. 8 is a simplified block diagram of at least one embodiment of the micro digital signage devices of FIG. 4 not identified by the micro digital signage server of FIGS. 1 and 3 using the composite image of FIG. 7.

Referring now to FIG. 8, an embodiment of the shelving unit 400, including the MDS devices 402-424, after the MDS server 102 has performed identification on the generated composite image 700 is shown. As discussed above, the MDS server 102 may instruct one or more of the identified MDS devices 402-424 to stop displaying its corresponding unique identifier. In response to receiving such an instruction, the one or more identified MDS devices 420-424 may gray out (e.g., dim, shade, clear, etc.) display of its corresponding unique identifier. For example, as shown in the illustrative embodiment, one or more MDS devices 120 (e.g., the MDS device 406) may be instructed to gray out 850 its corresponding unique identifier in response to having its location identified within the composite image 700 by the MDS server 102. In contrast, in response to not having its location identified within the composite image 700 by the MDS server 102, one or more MDS devices (e.g., the MDS device 404) may not receive an instruction to gray out display of its corresponding unique identifier. As a result, those MDS devices 120 (e.g., MDS device 404) may continue to display 810 their corresponding unique identifiers. In that way, a user or administrator of the MDS server 102 may only be required to enter the locations of the MDS devices 120 manually for which the MDS server 102 was unable to identify a location from the composite image 700.

Figure 9:
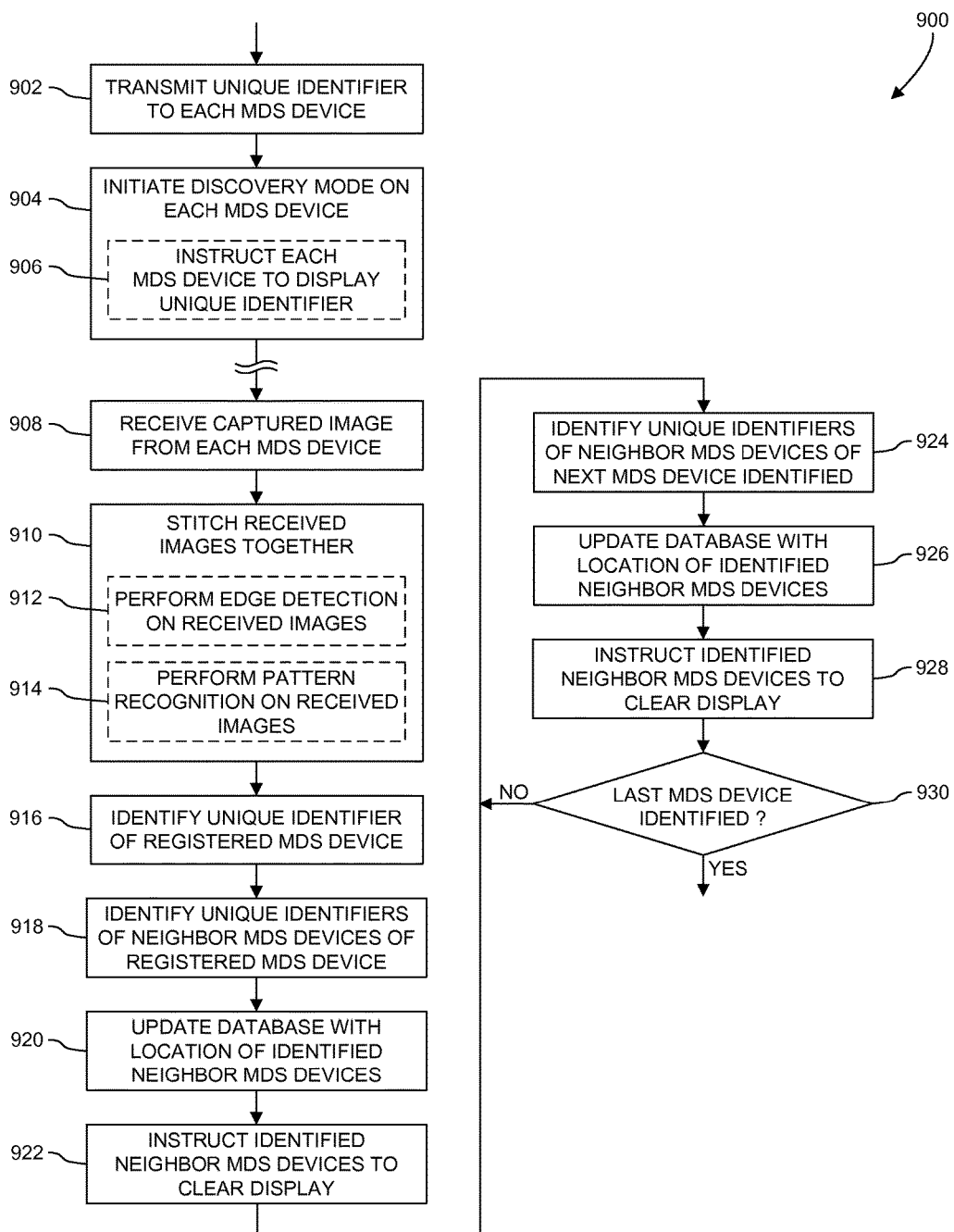
FIG. 9 is a simplified flow diagram of at least one embodiment of a method for determining a location of the micro digital signage devices of FIGS. 1 and 2.

Referring now to FIG. 9, one embodiment of a method 900 for determining a location of the MDS devices 120 begins with block 902. In block 902, the MDS server 102 transmits a unique identifier to each MDS device 122. As discussed above, in various embodiments, the unique identifier may be embodied as a unique number surrounded on either side by a "dash mark." Additionally or alternatively, the unique identifier may be embodied as a unique character string, an image, a barcode, or any other suitable type of displayable mark or notation for uniquely identifying each of the MDS devices 120. The method 900 then advances to block 904.

In block 904, the MDS server 102 initiates a discovery mode on each of the MDS devices 120. To do so, the MDS server 102 may generate and then transmit one or more messages and/or commands that cause one or more of the MDS devices 120 to enter the discovery mode. In block 906, the MDS server 102 may instruct each of the MDS devices 120 to display its corresponding unique identifier in some embodiments.

Subsequently, in block 908, the MDS server 102 receives one or more images captured by one or more of the MDS devices 120. In some embodiments, one or more MDS devices 120 attached to a shelving unit (e.g., the shelving unit 510) on one side of an aisle (e.g., the aisle 500) may capture images (e.g., the captured images 600-650) of one or more MDS devices 120 attached to another shelving unit (e.g., the shelving unit 400) located on the other side of the aisle. It should be understood that the MDS server 102 may receive images captured by MDS devices 120 on either side of the aisle 500.

In block 910, the MDS server 102 "stitches" together the received images to generate the composite image 700 (see FIG. 7) of the one or more MDS devices 120 located on one side of the aisle 500. That is, for each side of the aisle, the MDS server 102 may "stitch" together images captured by MDS devices 120 located on the opposite side of the aisle 500. To facilitate stitching together of the captured images 600-650 received from the one or more MDS devices 120 into a composite image 700, the MDS server 102 may perform edge detection and/or pattern recognition on the captured images 600-650 in blocks 912 and 914 as discussed above.

In block 916, the MDS server 102 identifies a unique identifier of a registered MDS device 122 from the composite image 700. The registered MDS device 122 may be embodied as a MDS device 122 in which its location on a particular shelving unit (e.g., the shelving unit 400) is previously known (e.g., manually configured by a user or administrator of the MDS server 102). In response to identifying the unique identifier corresponding to the registered MDS device 122 from within the composite image 700, the method 900 advances to block 918.

In block 918, the MDS server 102 identifies one or more unique identifiers of MDS devices 120 neighboring (e.g., in close proximity to) the registered MDS device 122 from the composite image 700. Using the known location of the registered MDS device 122 as a reference point, the MDS server 102 may then determine the location of each of the MDS devices 120 neighboring the registered MDS device 122. The method 900 then advances to block 920 in which the MDS server 102 updates a database to thereby associate the unique identifier of each of the neighboring MDS devices 120 identified within the composite image 700 with its determined location. The method 900 then advances to block 922.

In block 922, the MDS server 102 instructs each of the MDS devices 120 identified as neighboring the registered MDS device 122 to gray out (e.g., dim, shade, clear, etc.) display of its corresponding unique identifier. In block 924, the MDS server 102 identifies one or more unique identifiers of MDS devices 120 neighboring (e.g., in close proximity to) the next MDS device 122 for which the location is known. It should be understood that the next MDS device 122 in some embodiments may be one of the MDS devices 120 identified as neighboring the registered MDS device 122. Using the known location of the next MDS device 122 as a reference point, the MDS server 102 may then determine the location of each of the MDS devices 120 neighboring the next MDS device 122. The method 900 then advances to block 926 in which the MDS server 102 updates a database to thereby associate the unique identifier of each of the neighboring MDS devices 120 identified from within the composite image 700 with its determined location. The method 900 then advances to block 928.

In block 928, the MDS server 102 instructs each of the MDS devices 120 identified as neighboring the next MDS device 122 to gray out (e.g., dim, shade, clear, etc.) display of its corresponding unique identifier. Subsequently, in block 930, the MDS server 102 determines whether the next MDS device 122 is the last MDS device 122 identified from within the composite image 700. For example, the MDS server 102 determines whether any other MDS devices 120 for which the location is known (e.g., manually configured and/or determined by the MDS server 102) remain. In response to determining that the next MDS device 122 is not the last MDS device 122 identified from within the composite image 700, the method 900 loops back to block 924 in which the MDS server 102 identifies one or more unique identifiers of MDS devices 120 neighboring (e.g., in close proximity to) the next MDS device 122 for which the location is known.

EXAMPLES

Illustrative examples of the devices, systems, and methods disclosed herein are provided below. An embodiment of the devices, systems, and methods may include any one or more, and any combination of, the examples described below.

Example 1 includes a server for determining a location of micro digital signage devices. The server includes a display generation module to (i) generate a unique identifier corresponding to each of a plurality of micro digital signage devices and (ii) instruct each of the plurality of micro digital signage devices to display its corresponding unique identifier; and an image analysis module to (i) receive images of a first group of the plurality of micro digital signage devices captured by a second group of the plurality of micro digital signage devices, (ii) generate a composite image of the first group of the plurality of micro digital signage devices from the captured images of the first group of the plurality of micro digital signage devices, (iii) identify, from the composite image, a first unique identifier corresponding to a first micro digital signage device having a known location, (iv) identify, from the composite image, a second unique identifier corresponding to a second micro digital signage device that is adjacent to the first micro digital signage device, and (v) determine a location of the second micro digital signage device as a function of the known location of the first micro digital signage device.

Example 2 includes the subject matter of Example 1, and wherein the display generation module is further to instruct one or more of the plurality of micro digital signage devices to stop displaying its corresponding unique identifier.

Example 3 includes the subject matter of any of Examples 1 and 2, and wherein to instruct one or more of the plurality of micro digital signage devices to stop displaying its corresponding unique identifier includes to instruct one or more of the plurality of micro digital signage devices to at least one of: gray out, dim, shade, or clear its corresponding unique identifier.

Example 4 includes the subject matter of any of Examples 1-3, and wherein to instruct one or more of the plurality of micro digital signage devices to stop displaying its corresponding unique identifier includes to instruct the first and second micro digital signage devices to stop displaying their corresponding unique identifiers in response to identifying the corresponding first and second unique identifiers.

Example 5 includes the subject matter of any of Examples 1-4, and wherein to generate a composite image of the first group of the plurality of micro digital signage devices from the captured images includes to perform at least one of (i) an edge detection process and (ii) a pattern recognition process on the captured images of the first group of the plurality of micro digital signage devices.

Example 6 includes the subject matter of any of Examples 1-5, and wherein the display generation module is further to instruct at least one of the micro digital signage devices to capture an image of one or more other micro digital signage devices.

Example 7 includes the subject matter of any of Examples 1-6, and wherein the display generation module is further to generate product information to be displayed on a display of one or more of the micro digital signage devices.

Example 8 includes the subject matter of any of Examples 1-7, and wherein the product information to be displayed on the display of one or more of the micro digital signage devices includes at least one of a product price, product reviews, product discount information, a recipe, product nutrition information, or a promotion.

Example 9 includes the subject matter of any of Examples 1-8 and further includes a data storage to store the unique identifier, location data, and an Internet Protocol address corresponding to each of the plurality of micro digital signage devices.

Example 10 includes the subject matter of any of Examples 1-9, and wherein the image analysis module is further to update the location data corresponding to the second micro digital signage device in the data storage in response to determining the location of the second micro digital signage device.

Example 11 includes the subject matter of any of Examples 1-10 and further includes a communication module to communicate over a network with one or more of the plurality of micro digital signage devices.

Example 12 includes the subject matter of any of Examples 1-11, and wherein to communicate over a network with one or more of the plurality of micro digital signage devices includes to (i) transmit each generated unique identifier to a corresponding micro digital signage device, (ii) transmit instructions to each of the micro digital signage devices to capture an image, and (iii) receive captured images and information from one or more of the plurality of micro digital signage devices.

Example 13 includes the subject matter of any of Examples 1-12, and wherein the unique identifier for each of the plurality of micro digital signage devices includes at least one of: a unique number, a unique character string, a unique image, or a unique barcode.

Example 14 includes the subject matter of any of Examples 1-13, and wherein the first group of the plurality of micro digital signage devices is attached to a shelving unit located on a first side of an aisle, wherein the second group of the plurality of micro digital signage devices is attached to a different shelving unit located on a second side of the aisle opposite the first side, and wherein to receive images of a first group of the plurality of micro digital signage devices captured by a second group of the plurality of micro digital signage devices includes to receive images of the first group of the plurality of micro digital signage devices attached to the shelving unit located on the first side of the aisle captured by the second group of the plurality of micro digital signage devices attached to the different shelving unit located on the second side of the aisle.

Example 15 includes the subject matter of any of Examples 1-14, and wherein the first group of the plurality of micro digital signage devices are attached to one or more rows of the shelving unit located on the first side of the aisle, and wherein the second group of the plurality of micro digital signage devices are attached to one or more rows of the different shelving unit located on the second side of the aisle.

Example 16 includes a method for determining a location of micro digital signage devices. The method includes generating a unique identifier corresponding to each of a plurality of micro digital signage devices; instructing each of the plurality of micro digital signage devices to display its corresponding unique identifier; receiving images of a first group of the plurality of micro digital signage devices captured by a second group of the plurality of micro digital signage devices; generating a composite image of the first group of the plurality of micro digital signage devices from the captured images of the first group of the plurality of micro digital signage devices; identifying, from the composite image, a first unique identifier corresponding to a first micro digital signage device having a known location; identifying, from the composite image, a second unique identifier corresponding to a second micro digital signage device that is adjacent to the first micro digital signage device; and determining a location of the second micro digital signage device as a function of the known location of the first micro digital signage device.

Example 17 includes the subject matter of Example 16 and further includes instructing one or more of the plurality of micro digital signage devices to stop displaying its corresponding unique identifier.

Example 18 includes the subject matter of any of Examples 16 and 17, and wherein instructing one or more of the plurality of micro digital signage devices to stop displaying its corresponding unique identifier includes instructing one or more of the plurality of micro digital signage devices to at least one of: gray out, dim, shade, or clear its corresponding unique identifier.

Example 19 includes the subject matter of any of Examples 16-18, and wherein instructing one or more of the plurality of micro digital signage devices to stop displaying its corresponding unique identifier includes instructing the first and second digital signage devices to stop displaying their corresponding unique identifiers in response to identifying the unique identifiers corresponding to each of the first and second digital signage devices.

Example 20 includes the subject matter of any of Examples 16-19, and wherein generating a composite image of the first group of the plurality of micro digital signage devices from the captured images includes performing at least one of (i) an edge detection process and (ii) a pattern recognition process on the captured images of the first group of the plurality of micro digital signage devices.

Example 21 includes the subject matter of any of Examples 16-20 and further includes instructing at least one of the micro digital signage devices to capture an image of one or more other micro digital signage devices.

Example 22 includes the subject matter of any of Examples 16-21 and further includes generating product information to be displayed on a display of one or more of the micro digital signage devices.

Example 23 includes the subject matter of any of Examples 16-22, and wherein the product information to be displayed on the display of one or more of the micro digital signage devices includes at least one of a product price, product reviews, product discount information, a recipe, product nutrition information, or a promotion.

Example 24 includes the subject matter of any of Examples 16-23 and further includes storing the unique identifier, location data, and an Internet Protocol address corresponding to each of the plurality of micro digital signage devices in a data storage.

Example 25 includes the subject matter of any of Examples 16-24 and further includes updating the location data corresponding to the second micro digital signage device in the data storage in response to determining the location of the second micro digital signage device.

Example 26 includes the subject matter of any of Examples 16-25 and further includes communicating over a network with one or more of the plurality of micro digital signage devices.

Example 27 includes the subject matter of any of Examples 16-26, and wherein communicating over a network with one or more of the plurality of micro digital signage devices includes (i) transmitting each generated unique identifier to a corresponding micro digital signage device, (ii) transmitting instructions to each of the micro digital signage devices to capture an image, and (iii) receiving captured images and information from one or more of the plurality of micro digital signage devices.

Example 28 includes the subject matter of any of Examples 16-27, and wherein the unique identifier for each of the plurality of micro digital signage devices includes at least one of: a unique number, a unique character string, a unique image, or a unique barcode.

Example 29 includes the subject matter of any of Examples 16-28, and wherein the first group of the plurality of micro digital signage devices is attached to a shelving unit located on a first side of an aisle, wherein the second group of the plurality of micro digital signage devices is attached to a different shelving unit located on a second side of the aisle opposite to the first side, and wherein receiving images of a first group of the plurality of micro digital signage devices captured by a second group of the plurality of micro digital signage devices includes receiving images of the first group of the plurality of micro digital signage devices attached to the shelving unit located on the first side of the aisle captured by the second group of the plurality of micro digital signage devices attached to the different shelving unit located on the second side of the aisle.

Example 30 includes the subject matter of any of Examples 16-29, and wherein the first group of the plurality of micro digital signage devices are attached to one or more rows of the shelving unit located on the first side of the aisle, and wherein the second group of the plurality of micro digital signage devices are attached to one or more rows of the different shelving unit located on the second side of the aisle.

Example 31 includes a computing device for determining a location of micro digital signage devices, the computing device includes a processor; and a memory having stored therein a plurality of instructions that when executed by the processor cause the computing device to perform the method of any of Examples 16-30.

Example 32 includes one or more machine readable media including a plurality of instructions stored thereon that in response to being executed result in a computing device performing the method of any of Examples 16-30.

Example 33 includes a micro digital signage device for determining a location of another micro digital signage device. The micro digital signage device includes communication circuitry to receive a unique identifier from a micro digital signage server; a data storage to store the unique identifier received from the micro digital signage server; a display to display the unique identifier in response to the communication circuitry receiving instructions from the micro digital signage server; a camera to capture an image of one or more other micro digital signage devices in response to the communication circuitry receiving instructions from the micro digital signage server; and wherein the communication circuitry further to transmit the captured image of the one or more other micro digital signage devices to the micro digital signage server for identification, and wherein the display is to stop displaying the unique identifier in response to the communication circuitry receiving instructions from the micro digital signage server.

Example 34 includes the subject matter of Example 33, and wherein to stop displaying the unique identifier in response to the communication circuitry receiving instructions from the micro digital signage server includes to at least one of gray out, dim, shade, or clear the unique identifier.

Example 35 includes the subject matter of any of Examples 33 and 34, wherein the display is further to display product information received from the micro digital signage server.

Example 36 includes the subject matter of any of Examples 33-35, and wherein the product information received from the micro digital signage server includes at least one of: a product price, product reviews, product discount information, a recipe, product nutrition information, or a promotion.

Example 37 includes subject matter of any of Examples 33-36, and wherein the unique identifier includes at least one of: a unique number, a unique character string, a unique image, or a unique barcode.

Example 38 includes the subject matter of Example 33-37, and wherein the micro digital signage device is attached to a shelving unit located on a first side of an aisle, wherein the one or more other micro digital signage devices are attached to a different shelving unit located on a second side of the aisle opposite the first side, and wherein to capture an image of one or more other micro digital signage devices includes to capture an image of one or more other micro digital signage devices attached to the different shelving located on the second side of the aisle.

Example 39 includes the subject matter of any of Examples 33-38, and wherein the micro digital signage device is attached to a row of the shelving unit located on the first side of the aisle, and wherein the one or more other micro digital signage devices are attached to one or more rows of the different shelving unit located on the second side of the aisle.

The invention claimed is:

1. A micro digital signage device for determining a location of another micro digital signage device, the micro digital signage device comprising:
   communication circuitry to receive a unique identifier from a micro digital signage server, wherein the unique identifier uniquely identifies the micro digital signage device from other micro digital signage devices;
   a data storage to store the unique identifier received from the micro digital signage server;
   a display to display the unique identifier in response to the communication circuitry receiving instructions from the micro digital signage server;
   a camera to capture an image of another micro digital signage device that is attached to a shelving unit different from a shelving unit to which the micro digital signage device is attached in response to the communication circuitry receiving instructions from the micro digital signage server; and
   wherein the communication circuitry further to transmit the captured image of the one or more other micro digital signage devices to the micro digital signage server for identification, and wherein the display is to stop displaying the unique identifier in response to the communication circuitry receiving instructions from the micro digital signage server.

2. The micro digital signage device of claim 1, wherein to stop displaying the unique identifier in response to the communication circuitry receiving instructions from the micro digital signage server comprises to at least one of gray out, dim, shade, or clear the unique identifier.

3. The micro digital signage device of claim 2, wherein the display is further to display product information received from the micro digital signage server.

4. The micro digital signage device of claim 3, wherein the product information received from the micro digital signage server comprising at least one of: a product price, product reviews, product discount information, a recipe, product nutrition information, or a promotion.

5. The micro digital signage device of claim 1, wherein unique identifier comprises at least one of a unique number, a unique character string, a unique image, or a unique barcode.

6. The micro digital signage device of claim 1, wherein the micro digital signage device is attached to a row of the shelving unit located on the first side of the aisle, and
   wherein the one or more other micro digital signage devices are attached to one or more rows of the different shelving unit located on the second side of the aisle.

7. One or more machine readable storage media comprising a plurality of instructions stored thereon that, in response to being executed, cause a micro digital signage device to:
   receive device, a unique identifier from a micro digital signage server, wherein the unique identifier uniquely identifies the micro digital signage device from other micro digital signage devices;
   store the unique identifier in a local storage;
   display, on a display of the micro digital signage device, the unique identifier in response to receipt of instructions from the micro digital signage server to display the unique identifier;
   capture, by a camera of the micro digital signage device, an image of another micro digital signage device that is attached to a shelving unit different from a shelving unit to which the micro digital signage device is attached in response to receipt of instructions from the micro digital signage server to capture the image;
   transmit the captured image of the one or more other micro digital signage devices to the micro digital signage server for identification; and
   stop the displaying of the unique identifier on the display in response to receipt of instructions from the micro digital signage server to stop the display of the unique identifier.

8. The one or more machine readable storage media of claim 7, wherein to stop the displaying of the unique identifier comprises to at least one of gray out, dim, shade, or clear the unique identifier on the display.

9. The one or more machine readable storage media of claim 8, wherein the plurality of instructions further cause the micro digital signage device to display, on the display of the micro digital signage device, product information in response to receipt of the product information from the micro digital signage server.

10. The one or more machine readable storage media of claim 9, wherein the product information comprises at least one of: a product price, product reviews, product discount information, a recipe, product nutrition information, or a promotion.

11. The one or more machine readable storage media of claim 7, wherein the unique identifier comprises at least one of a unique number, a unique character string, a unique image, or a unique barcode.

12. A method for determining a location of another micro digital signage device, the method comprising:
    receiving, by a micro digital signage device, a unique identifier from a micro digital signage server, wherein the unique identifier uniquely identifies the micro digital signage device from other micro digital signage devices;
    storing, by the micro digital signage device, the unique identifier in a local storage;
    displaying, on a display of the micro digital signage device, the unique identifier in response to receiving instructions from the micro digital signage server to display the unique identifier;
    capturing, by a camera of the micro digital signage device, an image of another micro digital signage device that is attached to a shelving unit different from a shelving unit to which the micro digital signage device is attached in response to receiving instructions from the micro digital signage server to capture the image;
    transmitting, by the micro digital signage device, the captured image of the one or more other micro digital signage devices to the micro digital signage server for identification; and
    stopping, by the micro digital signage device, the displaying of the unique identifier on the display in response to receiving instructions from the micro digital signage server to stop the display of the unique identifier.

13. The method of claim 12, wherein stopping the displaying of the unique identifier comprises to at least one of graying out, dimming, shading, or clearing the unique identifier on the display.

14. The method of claim 13, further comprising displaying, on the display of the micro digital signage device, product information in response to receiving the product information from the micro digital signage server.

15. The method of claim 14, wherein the product information comprises at least one of: a product price, product reviews, product discount information, a recipe, product nutrition information, or a promotion.

16. The method of claim 12, wherein the unique identifier comprises at least one of a unique number, a unique character string, a unique image, or a unique barcode.

* * * * *